(12) United States Patent
Heidrich et al.

(10) Patent No.: US 8,932,697 B2
(45) Date of Patent: Jan. 13, 2015

(54) COMPOSITE MATERIAL ASSEMBLY

(75) Inventors: Armin Heidrich, Braunschweig (DE);
Mark Whiter, Saffron Walden (GB);
David Tilbrook, Saffron Walden (GB)

(73) Assignee: Hexcel Composites Limited, Cambridge (GB)

( * ) Notice: Subject to any disclaimer, the term of this patent is extended or adjusted under 35 U.S.C. 154(b) by 1769 days.

(21) Appl. No.: 12/307,591

(22) PCT Filed: Jul. 11, 2007

(86) PCT No.: PCT/GB2007/002599
§ 371 (c)(1),
(2), (4) Date: Mar. 9, 2009

(87) PCT Pub. No.: WO2008/007094
PCT Pub. Date: Jan. 17, 2008

(65) Prior Publication Data
US 2009/0252916 A1    Oct. 8, 2009

(30) Foreign Application Priority Data
Jul. 12, 2006   (GB) .................... 0613834.1

(51) Int. Cl.
*B32B 33/00*    (2006.01)
*D03D 27/00*    (2006.01)
*D04H 1/00*    (2006.01)

(52) U.S. Cl.
USPC ............. 428/86; 442/327; 442/361; 442/374; 442/381; 264/257; 264/258; 428/131; 428/141; 428/292.7

(58) Field of Classification Search
USPC ............. 428/411.1, 219–220, 131, 137, 141, 428/297.4, 474.4, 86, 292.7; 442/381, 374, 442/392, 361, 327
See application file for complete search history.

(56) References Cited

U.S. PATENT DOCUMENTS

| 6,261,675 B1* | 7/2001 | Hsiao et al. ................. 428/219 |
| 6,521,331 B1* | 2/2003 | Sikorski et al. ............ 428/292.1 |
| 2004/0067711 A1* | 4/2004 | Bliton et al. ................ 442/394 |

FOREIGN PATENT DOCUMENTS

| EP | 0469309 | 2/1992 |
| EP | 0622178 | 2/1994 |
| GB | 2364957 | 2/2002 |
| GB | 2379633 | 3/2003 |
| WO | WO99/38683 | 8/1999 |

* cited by examiner

Primary Examiner — Lynda Salvatore
(74) Attorney, Agent, or Firm — W. Mark Bielawski; David J. Oldenkamp

(57) ABSTRACT

A composite material assembly (1) comprises a) a surface enhancing layer (5) comprising at least one layer of fibers, having a length to width aspect ratio of more than 5:1 and b) a structural layer (7) comprising at least one reinforcing fiber and at least one polymeric matrix.

20 Claims, 3 Drawing Sheets

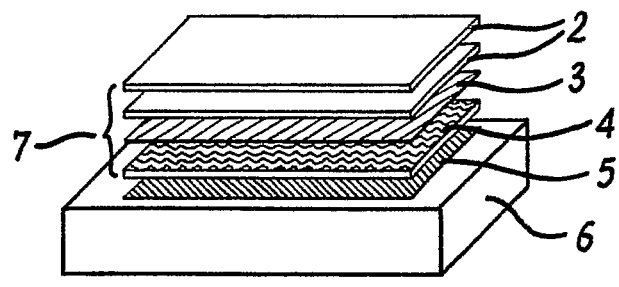
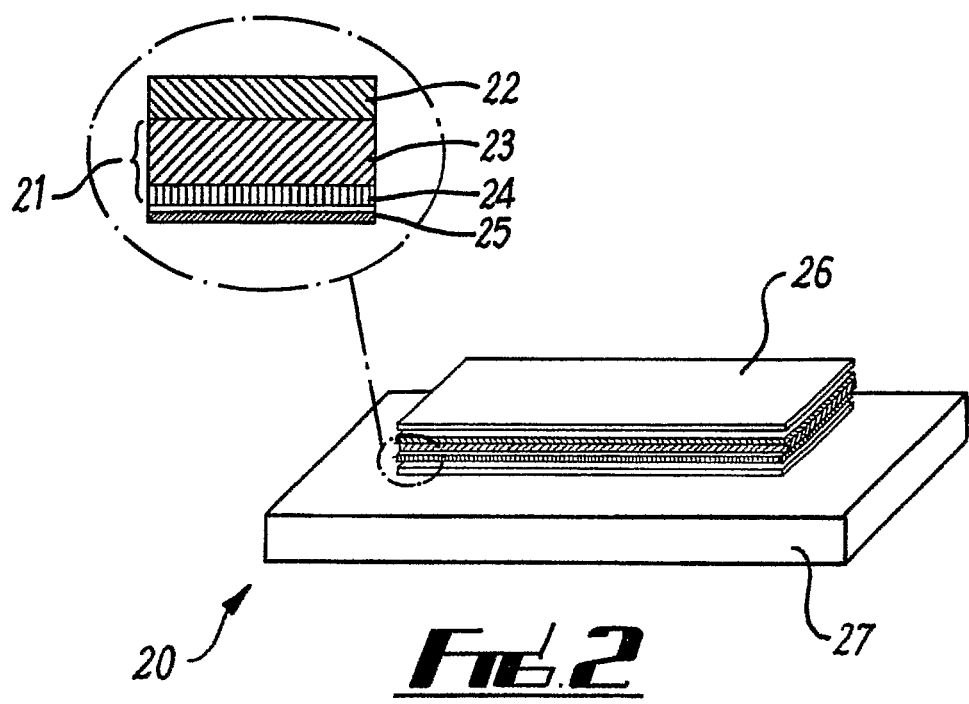

COMPOSITE MATERIAL ASSEMBLY

The present invention relates to composite laminates and particularly, but not exclusively, to fibre reinforced composite laminates.

Cured composite laminates require a considerable amount of surface preparation to give an acceptable quality of painted surface finish. A major reason for this is that such fibre-reinforced composite laminates often have a rough or wavy surface aspect. The irregularities of the surface are usually linked to the position of the fibre reinforcement, and surface patterns are often formed that are characteristic of the fibre reinforcement structure. Such irregularity patterns are frequently referred to as fibre print-through.

Fibre print-through in composite laminates is commonly encountered with a broad range of fibre types, including carbon fibre and glass fibre. The problem is considerably worse in cases of heavy coarsely woven reinforcement fabrics. Additionally, another contributing factor to the surface appearance is laminate porosity in an area at, or close to, the laminate surface. Sandwich type laminate constructions can also show print-through, although for these laminates the print-through is that of the honeycomb core.

Attempts have been made to overcome the surface irregularities of fibre reinforced composite laminates. One approach has been the use of gel-coat priming layers to provide an acceptable surface finish suitable for painting. In such instances, a high solids gel-coat is applied to the inside of a mould, the gel-coat being partially gelled prior to application of the required number of plies of fibre-reinforced resin material. This gel-coated composite material pre-impregnated (prepreg) assembly is then fully cured. However, to achieve effective reduction of fibre print-through, relatively thick coatings of at least 0.3 mm of gel-coat may be required. These thick coatings can be undesirable in large structures where weight is a critical limitation. Additionally, gel-coats have the disadvantage that they are two-part systems comprising resin and curative components, and their use requires a residence time between application and partial cure of the gel-coat and proceeding to final cure of the prepreg lay-up. Furthermore, severely irregular surfaces cannot be remedied simply by use of a gel-coat.

Another approach is to use surface finishing films. These are films of thermoset resins that are supported on non-woven mat carriers or veils to facilitate handling of the film. The non-woven mat carriers are typically 12-18 gsm in weight, and the overall film weight including the resin is typically in the range 150 to 250 gsm. Most non-woven mat carriers are manufactured from apparel grade polyester or nylon fibres that are approximately 10 µm in diameter. A 12 gsm veil is typically 80 to 100 µm thick. The inclusion of this fibrous support improves surface finish and reduces print-through as the fibres bridge surface defects and provide localised reinforcement. To ensure a surface finish free from visible pinhole defects, surface finishing film formulations are generally based on resins which have a higher viscosity than the matrix resin used in the laminating material. The viscosity difference between these two resin systems is frequently a factor of two or more. This helps to avoid problems with the resin system of the surfacing film bleeding back into the resin system of the prepreg during cure. Surfaces resulting from the use of surface finishing films still often have significant surface roughness, which is intrinsic to the films themselves and particularly to the carriers which are used to support the resin.

While offering an improvement on unfinished surfaces, these film treated surfaces can still require considerable preparation if the surface needs to be painted, particularly when pinholes are evident. The amount of work required prior to painting is dictated by the quality of the surface arising from the use of the selected surface finishing film.

The present invention seeks to provide a fibre reinforced composite laminate which has a superior surface finish, thus requiring less surface preparation prior to painting.

According to a first aspect of the present invention there is provided a composite material assembly comprising;
a) a surface enhancing layer comprising at least one layer of fibres, said individual fibres having a length to width aspect ratio of more than 5:1: and
b) a structural layer comprising at least one reinforcing fibre and at least one polymeric matrix.

According to a second aspect of the present invention there is provided a kit for making a composite material assembly, said kit comprising;
a) a first material for providing a surface enhancing layer, said first material comprising at least one layer of fibres, said individual fibres having a length to width aspect ratio of more than 5:1: and
b) a second material for providing a structural layer, said second material comprising at least one reinforcing fibre and at least one polymeric matrix.

The invention has particular, but not exclusive, application in the manufacture of moulded composite structures.

The composite material assembly of the invention exhibits an improved surface finish in comparison to conventional composites.

The layer of fibres in the surface enhancing layer may be just one of a plurality of discrete fibre layers or plates. The individual fibres of the surface enhancing layer preferably have a length to width aspect ratio of more than 50:1, more preferably more than 100:1, and ideally more than 700:1.

The individual fibres of the surface enhancing layer preferably have a width to thickness aspect ratio in the range from 20:1 to more than 1:1 and even 1:1. In one embodiment of the invention this width to thickness aspect ratio is in the range from 20:1 to 2:1. In another embodiment this aspect ratio is in the range from 15:1 to 9:1.

In one embodiment, these fibres may be made by segmenting existing fibres and then forming a film, or veil, of the segmented fibres. One manor of achieving this may be to form a slurry of the fibres and then drain away the liquid of the slurry, in like manner to papermaking.

In the context of this invention, "segmenting" means the longitudinal slicing of the fibre along its length into a number of discrete layers or plates. There can be from 5 to 15 layers per fibre. For example, a 10 µm diameter fibre can be slit into 1 µm thick layers and then subsequently used to make a veil. This produces a far denser veil structure (increased fibre density) for the same weight as that offered by a traditional veil when used alone or in conjunction with a matrix resin layer as part of a composite material assembly. The denser veil structure provides an improved surface finish, both in terms of appearance and smoothness.

A further improvement is observed when a non, partially or fully impregnated fleece is provided intermediate the surface enhancing layer and the structural layer. In these circumstances it is possible to provide a paint-ready composite surface finish that eliminates the need for a gel coat application.

The fibres of the surface enhancing layer may be fully, partially or un-impregnated with polymeric resin, such as thermoset matrix resin. Alternatively and/or additionally, a resin composition may be provided in the form of a separate layer that is in contact with the fibres, but does not impregnate the fibers. When a resin does form part of the surface enhancing fibrous veil layer, it is preferable that the resin is on the face making contact with the mold. Alternatively, the veil may be dry.

Suitable fibres for the veil include polyester, polyamide (such as NYLON (trade mark)), aramid, acrylics and any combination thereof. The preferred veil material is manufactured from a bicomponent fibre with a stacked structure consisting of alternating layers of polyester and polyamide, such as NYLON (trade mark). Upon manufacturing of the veil the fibres segment to yield filaments, of polyester and polyamide, ideally having a length to width aspect ratio in the range from 800 to 2,000. Preferably, there is from 55% to 70%, and ideally about 65%, polyester and from 30% to 40%, and ideally 35%, polyamide in the segmented veil. It is preferred that the areal weight of the veil is in the range from 5 to 20 gsm, more preferably from 7 to 15 gsm.

The veil preferably exhibits a degree of openness in the range from 5% to 9%, and preferably in the range from 5.4% to 6.4%. This may be determined using Optimas image software.

The individual veil fibres preferably have a width of no more than 20 µm. Preferred fibre widths are in the range from 5 µm to 20 µm, and still further from 7 µm to 17 µm.

The matrix resin of the surface enhancing layer is preferably a thermoset material and more preferably an epoxy resin. Suitable matrix systems are used in products such as Hex-Ply® M 9.1 and M 9.6 range available from Hexcel Composites, Duxford, England; WE 90 and WE 91 from SP Systems, Isle of Wight, England; LTM and MTM material from the Advanced Composites Group, Heanor, England.

The structural layer can be in many forms. Normally this layer will contain several layers of reinforcement although for some applications, a single layer may suffice.

The fibrous reinforcement may be based on synthetic or natural fibres, for example, fibreglass, carbon or aramid (aromatic polyamide) fibres, but the invention is particularly appropriate for fibreglass and carbon fibre reinforcements. Hybrid or mixed fibre systems may also be envisaged. The use of cracked (i.e. stretch-broken) or selectively discontinuous fibres may be advantageous to facilitate lay-up of the product according to the invention and improve its capability of being shaped.

The surface mass of fibres within the fibrous reinforcement is generally from 40 to 4000 $g/m^2$, preferably from 150 to 2500 $g/m^2$, and especially preferably from 300 to 1500 $g/m^2$. The number of carbon filaments can vary from 1000 to 320,000, again preferably from 3,000 to 160,000 and most preferably from 6,000 to 24,000. For fibreglass reinforcements, fibres of 600 to 2400 tex are preferred.

The preferred reinforcement form is a woven or non-crimped textile structure. Typical weave styles include plain, satin and twill weaves. Non-crimped or multiaxial reinforcements can have a number of plies and fibre orientations such as +45/−45; 0/+45/−45; 0/+45/−45/90. Such styles are well known in the composite reinforcement field and are available from a number of companies including Hexcel Reinforcements, Villeurbanne, France.

The matrix resin in the structural layer is a thermoset material preferably an epoxy resin. Suitable matrix systems include HexPly® M9.1 and M 9.6 range available from Hexcel Composites, Duxford, England; WE 90 and WE 91 from SP Systems, Isle of Wight, England; LTM and MTM materials from the Advanced Composites Group, Heanor, England. The resin content is preferably from 30 to 45% of the combined resin and reinforcing fibre weight with from 38 to 43% being preferred.

Various preferred embodiments of the structural layer are discussed below.

In a first embodiment the structural layer of the composite comprises layers of prepreg or partially impregnated prepreg. The matrix resin composition may be applied to the fibrous web in such a way as to either fully or partially impregnate the fibres. Alternatively, the said resin composition may be in the form of a separate layer that is in contact with the fibres, but does not impregnate the fibres. In this embodiment there is no dry reinforcement and no fleece.

In a second embodiment the first layer, i.e. the one in contact with the Surface Enhancing Layer has a non-woven fleece in contact with the reinforcement layer. The fleece prevents additional pinholing by acting as a barrier to keep the resin at or near the mould surface. This further enhances the surface finish. The fleece preferably has a fibre areal weight of from 30 to 70, and ideally substantially 50 grams per square meter. Glass is the preferred fibre for the fleece. The fleece may be stitched to the reinforcement layer or tacked via resin. In this embodiment the fleece is at least partially impregnated with resin and makes contact with the Surface Enhancing Layer. Subsequent layers may or may not require the use of a fleece. In the subsequent layers, the matrix resin composition may be applied to the fibrous web in such a way as to either fully or partially impregnate the fibres. Alternatively, the said resin composition in the additional layers may be in the form of a separate layer that is in contact with the fibres but does not impregnate the fibres.

In a third embodiment the first layer, i.e. the one in contact with the Surface Enhancing Layer has a fleece attached to the reinforcement layer. There is no matrix resin in the reinforcement of the first layer other than an epoxy resin film that is in contact with the fleece or slightly infuses into the reinforcement but to an extent such that less than the first 20%. of the reinforcement thickness is impregnated with resin. The epoxy resin film may be continuous or discontinuous. A discontinuous film layer is preferable as the dry fiber areas provide additional air escape paths during cure.

Examples of discontinuous film layers are described in European Patent application 1 338 406. The epoxy film makes contact with the Surface Enhancing Layer. The other face of the first layer comprises either an epoxy film or an epoxy prepreg. Subsequent layers may or may not require the use of a fleece. In the subsequent layers, the matrix resin composition may be applied to the fibrous web in such a way as to either fully or partially impregnate the fibers. Alternatively, the said resin composition may be in the form of a separate layer that is in contact with the fibres but does not impregnate the fibres.

In a fourth embodiment the first layer, i.e. the one in contact with the Surface Enhancing Layer is an epoxy film layer (no fleece). The second layer is a dry reinforcement layer followed by additional layers of prepreg that may be either fully or partially impregnated.

The composite assembly is used in such a way that the surface finish enhancing layer is always in contact with the mould surface. The mould may be made of metal, wood, ceramic or composite material such examples being well known to those skilled in the art. Composite and aluminium moulds have been used successfully.

In order that the invention may be more readily understood specific embodiments thereof will now be described, by way of example only, with reference to the accompanying drawings in which:—

FIG. 1 is a first composite material assembly in accordance with the invention;

FIG. 2 is a second composite material assembly in accordance with the invention;

Figure 3:
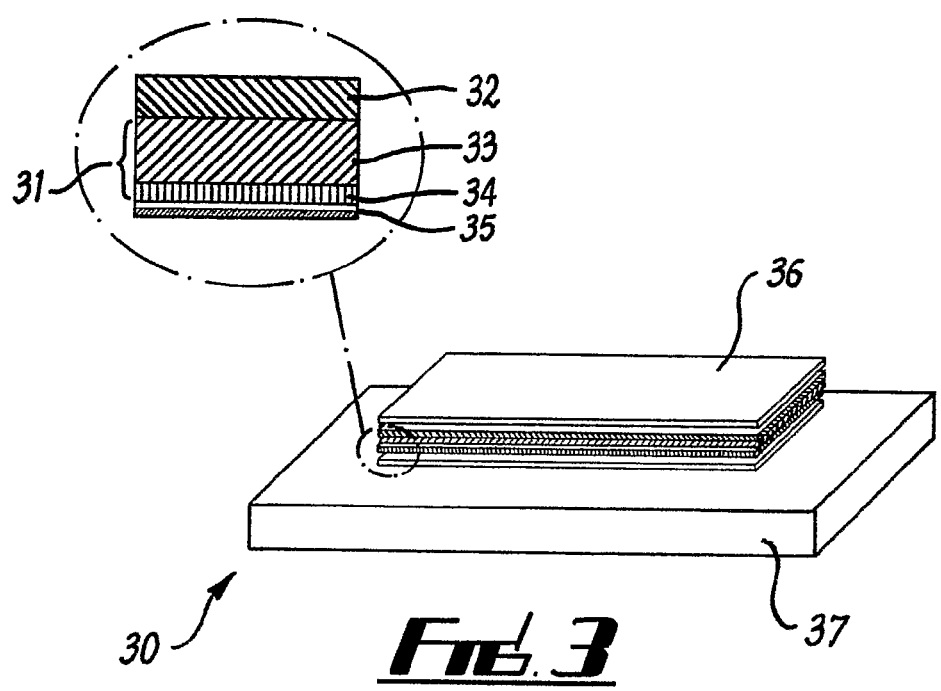
FIG. 3 is a third composite material assembly in accordance with the invention.

Referring to FIG. 1, there is shown an embodiment of a composite material assembly 1, which is placed on a mould 6. The assembly 1 comprises a surface enhancing veil layer 5 which is arranged on top of the mould 6. Additionally, the assembly 1 comprises structural layers 7 which are formed from an epoxy film layer 4, a dry glass fabric 3, and two layers of prepreg 2.

The surface enhancing layer 5 comprises an 11 gsm veil of Wramp® fibre which is formed from a blend of 65% polyester and 35% nylon. The veil was provided by Technical Fibre Products of Kendal, England. The fibre was sourced from Kuraray Co. Ltd., Tokyo, Japan.

The structural layer 7 comprises four sub layers detailed below;
  an epoxy film layer 4 of 500 gsm areal weight based on a bisphenol-A epoxy resin cured with dicyandiamide, a urone and an imidazole,
  a 120 style glass fabric layer 3 available from Hexcel Reinforcements, Villeurbanne, France, and
  two layers of prepreg 2 M9.6F/38%/LBB1200G available from Hexcel Composites Ltd., Duxford, England. The reinforcement, LBB1200G, is a triaxial glass style. The resin content was 38% of total prepreg weight.

The assembly was subjected to the following vacuum bag cure cycle;
  heat up at 1° C. per minute to 75° C., hold for 1 hour at 75° C., heat up at 1° C. per minute to 120° C. followed by a further hold of 1 hour at 120° C.

The technique of vacuum bag curing is well known in the industry e.g. "Prepreg Technology"—Hexcel Composites, 1997.

Referring to FIG. 2, there is shown a composite material assembly 20 placed onto a flat mould 27. The assembly 20 comprises a surface enhancing veil layer 25 which is arranged such that it is in contact with the mould 27.

The surface enhancing layer 25 comprises an 11 gsm veil of Wramp® fibre which is formed from a blend of 65% polyester and 35% NYLON (trade mark). Additionally, the surface enhancing layer 25 also comprises 30 gsm of an M9.1F epoxy resin matrix coated on one side. It is the epoxy resin matrix face of the surface enhancing layer 25 which is in contact with the mould 27.

The assembly 20 also comprises a structural layer comprising elements 21, 22, and 26. The uppermost (as illustrated) structural layer element 26 comprises two plies of a prepreg material and the intermediate structural layer element 22 comprises epoxy resin material based on a blend of liquid and solid bisphenol-A epoxies. The lowermost structural layer element (as illustrated) is formed from a fleece with resin stripes 24 printed upon the fibre layer 23, and two layers of prepreg 26.

In detail the structural layer comprises the following;
  an E glass triaxial reinforcement layer 23 of 1200 gsm areal weight (type LBB 1200 from Hexcel Reinforcements, Villeurbanne, France) having a 50 gsm fleece attached to one surface. M9.1F resin 24 was printed in the form of stripes onto the fleece, in a downweb i.e. longitudinal direction, to give a resin weight of 70 gsm. The stripes 24 were approximately 15 mm apart. These resin stripes 24 make contact with the surface enhancing layer 25;
  an additional 900 gsm epoxy resin layer 22 based on a blend of liquid and solid bisphenol-A epoxies, a flexibilizer, dicyandiamide and a urone; and
  two plies (layers) 26 of prepreg M9.6F/38%/LBB1200G.

The assembly 20 was subjected to the following vacuum bag cure cycle;
  heat to 80° C. at a rate of 2° C. per minute, hold for 2 hours at 80° C., raise the temperature to 120° C. at a heat up rate of 2° C. per minutes and hold for 1 hour at 120° C.

Referring to FIG. 3, there is shown a composite material assembly 30 which is placed onto a flat mould 37. The assembly 30 comprises a surface enhancing layer 35 which is arranged on top of a mould 37. The surface enhancing layer 35 comprises an 11 gsm veil of Wramp® fibre which is formed from a blend of 65% polyester and 35% nylon. Additionally, the surface enhancing layer 35 also comprises 30 gsm of an M9.1F epoxy resin matrix coated on one face thereof. The resin-coated of the surface enhancing layer 35 is in contact with the mould 37.

Additionally, the assembly 30 comprises a structural layer having three structural layer elements 31, 32, and 36. The uppermost and intermediate structural layer elements (as illustrated) comprise prepreg: i.e. two plies of prepreg M9.6F/38%/LBB1200G. The lowermost structural layer element is formed from a fibrous batt fleece 33 with resin stripes 34 printed upon the fleece 33.

The make up of the lowermost structural layer element (as illustrated) 31 is detailed below;
  an E glass triaxial reinforcement layer 33 of 1200 gsm areal weight (type LBB 1200 from Hexcel Reinforcements, Villeurbanne, France) having a 50 gsm fleece attached to one surface. M9.1F resin 34 is printed in the form of stripes onto the fleece, in a downweb i.e. longitudinal direction, to give a resin weight of 70 gsm. The resin stripes 34 are approximately 15 mm apart. These resin stripes 34 are in contact with the surface enhancing layer 35,
  a layer 32 of prepreg M9.6 LBB 1200 having a resin content of 61%.

This resin content is ideally higher than is conventional to ensure the correct amount of resin impregnates into the fleece 33.

The assembly 30 of FIG. 3 was subjected to the following vacuum bag cure cycle;
  heat to 80° C. at a rate of 2° C. per minute, hold for 2 hours at 80° C., raise the temperature to 120° C. at a heat up rate of 2° C. per minutes and hold for 1 hour at 120° C.

Figure 4:
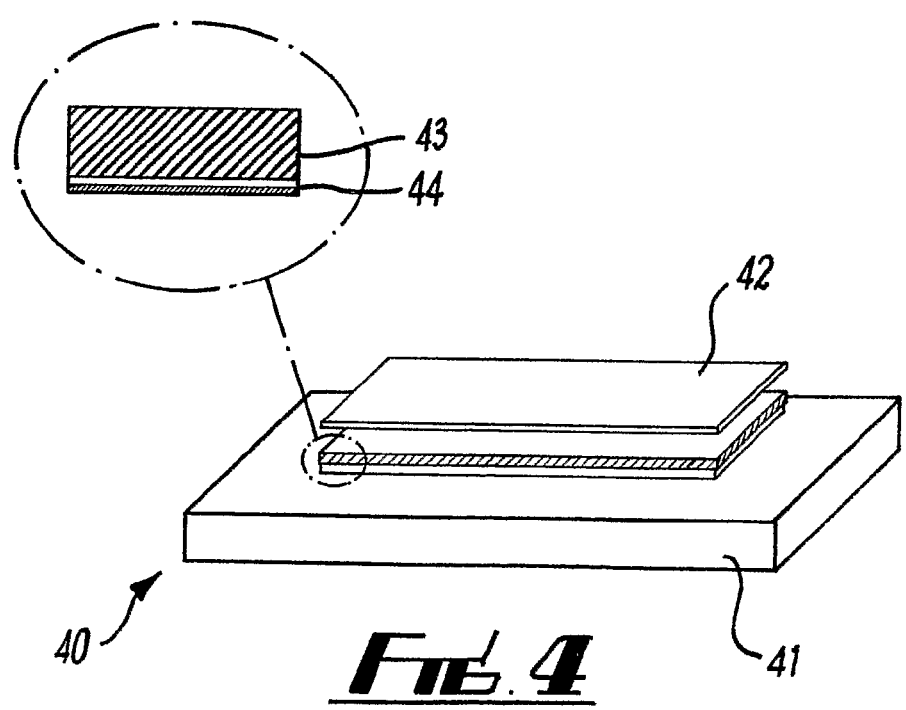
FIG. 4 is a fourth composite material assembly in accordance with the invention.

Referring to FIG. 4, there is shown a further composite material assembly 40 in accordance with the invention arranged on top of a mould 41. The assembly 40 comprises a surface enhancing layer 44 The surface enhancing layer 44 comprises an 11 gsm veil of Wramp® fibre which is formed from a blend of 65% polyester and 35% nylon. Additionally, the surface enhancing layer 44 also comprises 30 gsm of an M9.1F epoxy resin matrix coated on one face thereof. The resin coated face of the surface enhancing layer 44 is in contact with the mould 41.

The composite additionally comprises a structural layer having two structural layer elements 42, and 43. The uppermost structural layer elements 42, as illustrated, comprises prepreg; i.e. two plies (layers) 42 of prepreg M9.6F/38%/LBB1200G. The lowermost structural layer element comprises an E glass triaxial reinforcement layer of 1200 gsm areal weight (type LBB 1200 from Hexcel Reinforcements)

having a 50 gsm non-woven glass fleece attached to one surface. M 9.6F resin was fully impregnated into the reinforcement and fleece.

The assembly 40 was subjected to the following vacuum bag cure cycle;

heat to 80° C. at a rate of 2° C. per minute, hold for 2 hours at 80° C., raise the temperature to 120° C. at a heat up rate of 2° C. per minutes and hold for 1 hour at 120° C.

COMPARATIVE EXAMPLES

Comparative examples of the assembly of FIG. 1 were prepared using two other types of veil. One was a 25 gsm polyester mat type 20262 from Technical Fibre Products, Kendal, England, whilst the other was a 15 gsm polyester mat style H3115 from Freudenberg Nonwovens, Halifax, UK. These veils were used to prepare laminates by the method described with reference to FIG. 1.

Microscopic characterisation of the veils and laminate surface measurements of cured composites incorporating said veils were carried out as previously described. The results are shown in Table 1.

TABLE 1

Comparison of veil openness and laminate roughness for different veils.

| Veil | Areal Weight (gsm) | % Openness/Standard Deviation | Laminate Roughness Ra [µm] |
|---|---|---|---|
| Segmented Fibre | 11 | 5.9/0.67 | 0.83 |
| H3115 | 15 | 10.5/3.03 | 3.33 |
| 20262 | 25 | 12.5/1.29 | 1.63 |

The table shows that although the segmented fibre veil of the invention has a comparable areal weight to H3115 it has only half the openness which translates into a 75% reduction in laminate surface roughness.

Surface roughness of the cured laminate from example 1 was computed by carrying out a pinhole count. The roughness was determined to be 0.83 Ra [µm].

Surface Finish Comparisons

Further evidence of the contribution made by the veil of the invention and fleece to improving surface finish is shown by comparison of pinhole measurements on cured composite assemblies made without veil or fleece (reference sample 1), with fleece but no veil (reference sample 2) with veil but no fleece and with veil and fleece. Inventive assemblies based FIGS. 2, 3 and 4 substantially as described above were used for this comparison with the fleece and resin stripes removed in two of the five examples. The reference sample was M9.6F/38%/LBB1200G.

A composite mould was treated with Zyvax Enviroshield release agent, a technique well known in the art. For the reference material, 3 plies of prepreg were placed in the mould. For composite assemblies of the invention, the surface enhancing layer was always in direct contact with the mould. The structural layer comprising the sub layers as described in the Examples was applied. In two of the tests, there was no fleece and resin stripe component. Sub-layer 3 always comprised two plies of M9.6F/38%/LBB1200G prepreg The assemblies were vacuum bag cured as described with reference to FIG. 2.

The cured sample was demoulded and wiped with a slurry of carbon black in acetone. Any excess of slurry was washed away with further acetone. The sample was then observed under a Keyence VHX digital microscope system using 25× magnification and a gain setting of 9.00. The observed image was then manipulated using the system software such that the histogram slider was set between 000 and 065, the brightness tolerance set to 20 and the noise filter set to 10 in order to identify the surface defects (or pinholes). The software is then used to analyse the observed image, having an area of 132.63 mm$^2$ to measure the fraction of this area identified as pinholes and the mean area of observed pinholes Referring to FIG. 5, there is shown a plot of mean pinhole area against pinhole area percentage. This is used to graphically characterise the surface finish of the composite materials of the invention and comparative examples. The direction towards the bottom left of the graph area is the direction of improvement in surface finish.

Figure 5:
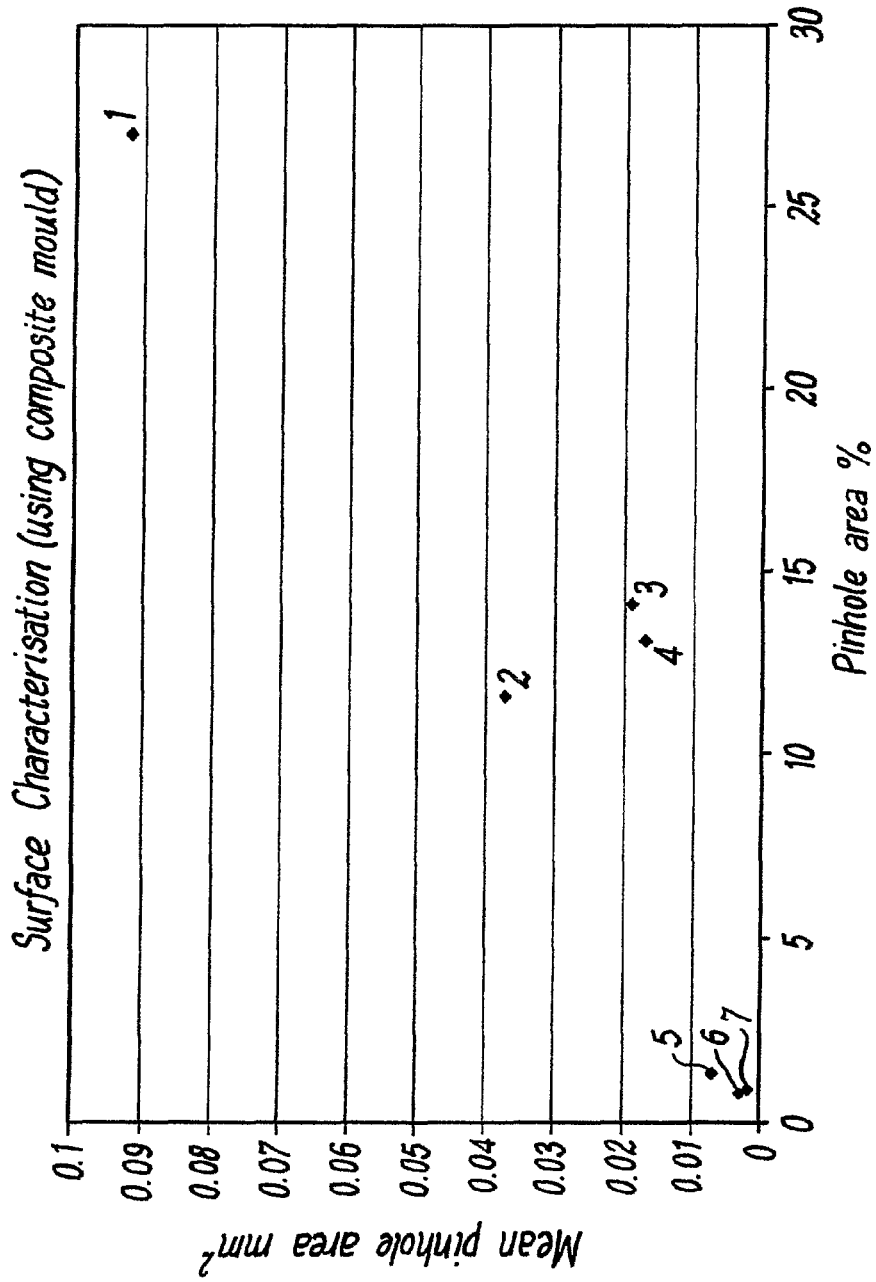
FIG. 5 is a graph of surface characterisation, plotting mean pinhole area against pinhole area percentage for a variety of composites, both of the invention and of comparative examples.

The points on the plot of FIG. 5 represent the following;
Point 1—Standard M9.6 prepreg (Reference 1).
Point 2—Standard M9.6 prepreg with glass fleece (Reference 2).
Point 3—Device as described with reference to FIG. 2 with veil of the invention, but no fleece.
Point 4—Device as described with reference to FIG. 4 with veil of the invention, but no fleece.
Point 5—Device as described with reference to FIG. 2 with veil of the invention and fleece.
Point 6—Device as described with reference to FIG. 3 with veil of the invention and fleece.
Point 7—Device as described with reference to FIG. 4 with veil of the invention and fleece.

The data as shown in FIG. 5 is also summarized in table 2:

TABLE 2

Data for FIG. 5.

| Composite Material Assembly | Pinhole Area % | Mean Pinhole Area (mm$^2$) |
|---|---|---|
| No veil and no fleece (Reference 1) | 27.0 | 0.092 |
| Fleece but no veil (Reference 2) | 11.6 | 0.037 |
| Veil but no fleece | 13.1-14.1 | 0.017-0.019 |
| Veil and fleece | 0.8-1.3 | 0.002-0.007 |

It is of course to be understood that the invention is not to be limited to the details of the above embodiments, which are described by way of example only. Many variations are possible.

The invention claimed is:

1. A composite material assembly having a surface and comprising:
   a) a surface enhancing layer located at the surface of said composite material assembly, said surface enhancing layer comprising a veil of fibers, said veil of fibers having a degree of openness that is from 5% to 9% and an areal weight of from 5 to 20 grams per square meter;
   b) at least one reinforcing fiber layer comprising a fibrous reinforcement and an uncured thermosetting resin matrix, said fibrous reinforcement having a surface mass of from 300 to 1500 grams per square meter; and
   c) a fleece layer located between said surface enhancing layer and said reinforcing fiber layer, said fleece layer comprising fibers wherein the fiber areal weight of said fleece layer is from 30 to 70 grams per square meter.

2. A composite material assembly according to claim 1 wherein said veil of fibers comprises thermoplastic fibers.

3. A composite material assembly according to claim 1 wherein said reinforcing fiber layer is a prepreg.

4. A composite material assembly according to claim 1 wherein said composite material assembly has been molded to form a composite material assembly that comprises a molded surface which comprises pinholes and wherein the mean area of said pinholes is 0.007 square millimeter per pinhole or less and the combined area of said pinholes amounts to 1.3% or less of the area of said surface of said composite material assembly.

5. A composite material assembly according to claim 2 wherein the thermoplastic fibers are polyester fibers, polyamide fibers, aramid fibers, acrylic fibers or combinations thereof.

6. A composite material assembly according to claim 5 wherein said thermoplastic fibers comprise polyester fibers and polyamide fibers.

7. A composite material assembly according to claim 1 wherein said veil of fibers comprises segmented fibers that are formed by longitudinally slicing fibers with circular cross sections to form said segmented fibers that are in the shape of a layer having a thickness, a width and a length.

8. A composite material assembly according to claim 7 wherein said segmented fibers have widths that are in the range of 5 to 20 micrometers.

9. A composite material assembly according to claim 7 wherein said fibers having said circular cross section have a cross sectional diameter of 10 micrometers.

10. A composite material according to claim 7 wherein said fiber with a circular cross section is longitudinally sliced to form from 5 to 15 segmented fibers.

11. A composite material assembly according to claim 7 wherein said segmented fibers have a width to thickness aspect ratio in the range of from 20:1 to 2:1.

12. A composite material assembly according to claim 7 wherein said segmented fibers have a length to width aspect ratio in the range of from 800:1 to 2000:1.

13. A composite assembly according to claim 1 which further comprises a first uncured thermosetting resin located between said surface enhancing layer and said fleece layer.

14. A composite assembly according to claim 13 wherein said first uncured thermosetting resin is in the form of a discontinuous layer.

15. A composite assembly according to claim 1 which further comprises a second uncured thermosetting resin located between said fiber reinforcing layer and said fleece layer.

16. A composite assembly according to claim 15 wherein said second uncured thermosetting resin is in the form of a resin layer that is free of fibers.

17. A composite assembly according to claim 16 which comprises a layer of dry fibers which is located between said layer of second uncured thermosetting resin and said fleece layer.

18. A composite assembly according to claim 15 wherein said second uncured thermosetting resin is impregnated into a fibrous support.

19. A composite assembly according to claim 18 which comprises a layer of dry fibers which is located between said second uncured thermosetting resin and said fleece layer.

20. A composite assembly according to claim 1 which further comprises a fibrous layer impregnated with uncured thermosetting resin which is located between said fleece layer and said reinforcing fiber layer.

\* \* \* \* \*